United States Patent [19]

Chou

[11] Patent Number: 5,716,132
[45] Date of Patent: Feb. 10, 1998

[54] AGRICULTURAL AGITATOR

[76] Inventor: Hwei-rung Chou, 10th Fl., No. 8, Alley 35, Lane 300, Sec. 4, Jen-ai Rd., Taipei, Taiwan

[21] Appl. No.: 743,942

[22] Filed: Nov. 5, 1996

[51] Int. Cl.⁶ .................... A01B 1/00; A01B 1/16
[52] U.S. Cl. .................... 366/129; 366/342; 172/371; 172/378; 172/381; 294/61; 294/50.6
[58] Field of Search .................... 366/129, 342, 366/343, 349; 7/114, 116; 172/21, 371, 374, 378, 381, 373; 294/49, 50.5, 50.6, 50.9, 61, 57, 55, 51

[56] References Cited

U.S. PATENT DOCUMENTS

| 144,542 | 11/1873 | Holman | 294/61 |
|---|---|---|---|
| 426,028 | 4/1890 | Lewis | 294/50.6 |
| 563,790 | 7/1896 | McGreevey | 294/61 |
| 1,025,360 | 5/1912 | Auter | 294/50.5 |
| 1,224,571 | 5/1917 | Schaier | 294/50.8 |
| 2,789,856 | 4/1957 | Russell | 294/61 |
| 2,843,359 | 7/1958 | Franz et al. | 294/50.6 |
| 2,896,926 | 7/1959 | Chapman | 366/129 |
| 4,944,081 | 7/1990 | Ross | 294/61 |

FOREIGN PATENT DOCUMENTS

| 483315 | 9/1929 | Germany | 294/61 |

*Primary Examiner*—Tony G. Soohoo
*Attorney, Agent, or Firm*—Kolisch, Hartwell, Dickinson, McCormack & Heuser

[57] ABSTRACT

An agricultural agitator used for disturbing matter such as compost includes a rod, a handle mounted on a top end of the rod, a first flat section formed at a middle portion thereof and a second flat section formed at a bottom end thereof. The second flat section is perpendicular to the first flat section and has a sharp tip at the bottom thereof. Two pairs of blades are respectively and pivotedly mounted on opposite sides of each of the first and second flat sections. Each blade resembles a tongue with a broad flat first end and a second end formed as two upright lugs.

5 Claims, 4 Drawing Sheets

AGRICULTURAL AGITATOR

BACKGROUND OF THE INVENTION

1. Field of the Invention

The present invention relates to an agricultural agitator, and more particularly to an agitator with easy operation used for disturbing compost.

2. Description of Related Art

Agitators are commonly used in gardening for accelerating the fermentation and gas exhaust of compost. In general, people use agitator tools such as spades, rakes and ploughs, etc. These agitator tools have a disadvantage that an inadequate or excessive surface on the tools for contacting with the compost will result in an inefficient disturbance. Furthermore, using these tools involves great effort.

The present invention provides an improved agricultural agitator to mitigate and/or obviate the aforementioned problems.

SUMMARY OF THE INVENTION

One object of the present invention is to provide an agricultural agitator with easy operation when used for disturbing manure, soil, etc.

In accordance with one aspect of the present invention, the agricultural agitator comprises a rod, a plurality of flat sections formed therealong and at a bottom tip thereof, each said flat section being perpendicular to subsequent flat sections, each of said flat sections having a pair of blades pivotedly mounted on opposite sides thereof, each blade resembling a tongue and defining a bowl therein.

In accordance with another aspect of the present invention, the rod further includes a handle mounted at a top position thereon.

In accordance with a further aspect of the present invention, the flat section formed at the bottom of the rod is shaped as a sharp tip.

In accordance with still a further aspect of the present invention, each of the blades has formed a serrated edge at a periphery thereof.

In accordance with still a further aspect of the present invention, the rod further includes a subsidiary handle mounted at an appropriate position thereon.

Other objects, advantages and novel features of the invention will become more apparent from the following detailed description when taken in conjunction with the accompanying drawings.

DETAILED DESCRIPTION OF PREFERRED EMBODIMENT

Figure 1:
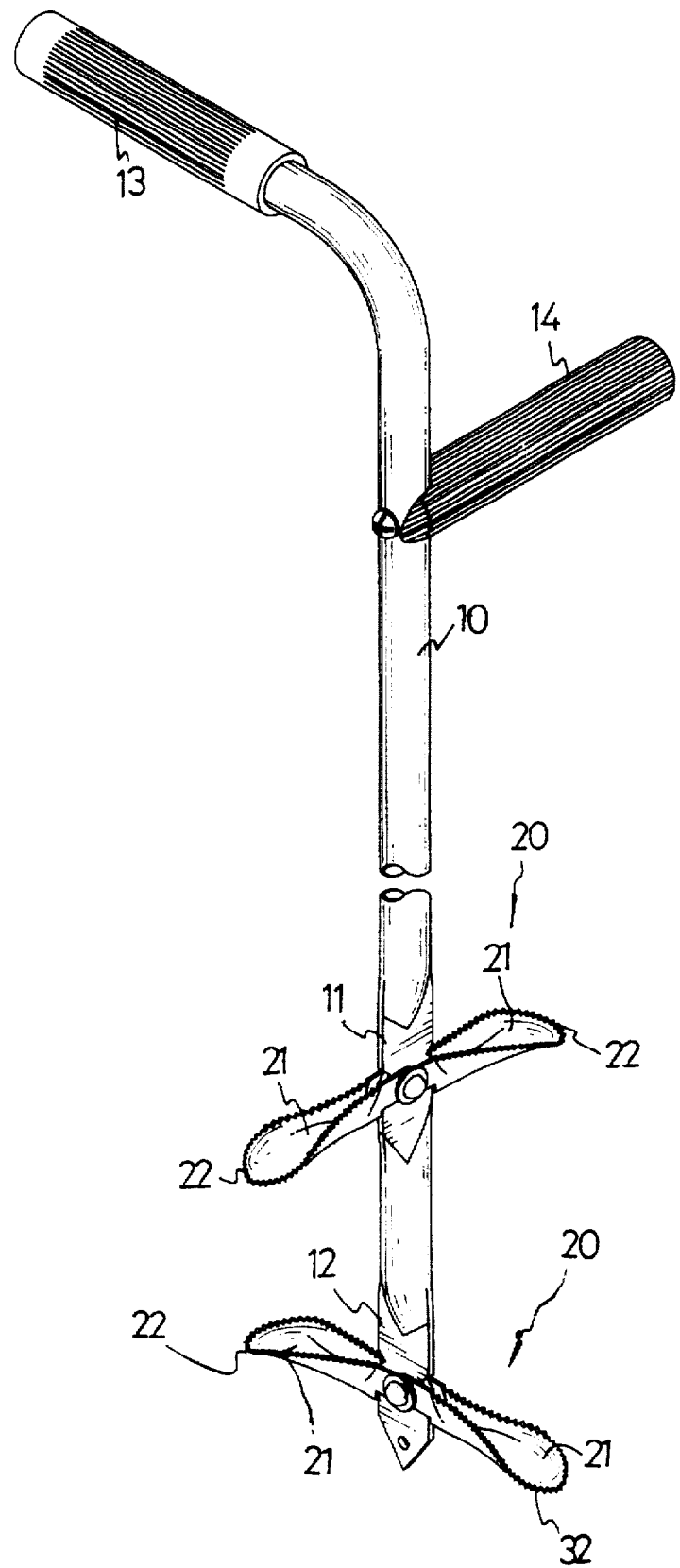
FIG. 1 is a perspective view showing an agricultural agitator in accordance with the preferred embodiment of the present invention.

Referring to FIG. 1, there is shown a perspective view of an agricultural agitator for compost in accordance with the preferred embodiment of the present invention. The agitator includes an erect rod 10, a top end of which is curved and receives a handle 13. A first flat section 11 is formed at a middle portion of the rod 10 and a second flat section 12 is formed at a bottom end of the rod 10. The second flat section 12 is perpendicular to the first flat section 11 and has a pointed tip at the bottom thereof so as to be able to be inserted into compost with ease. Two pairs of blades 20 are respectively and pivotedly mounted to opposite sides of each of the first and second flat sections 11, 12 in the following manner.

Figure 2:
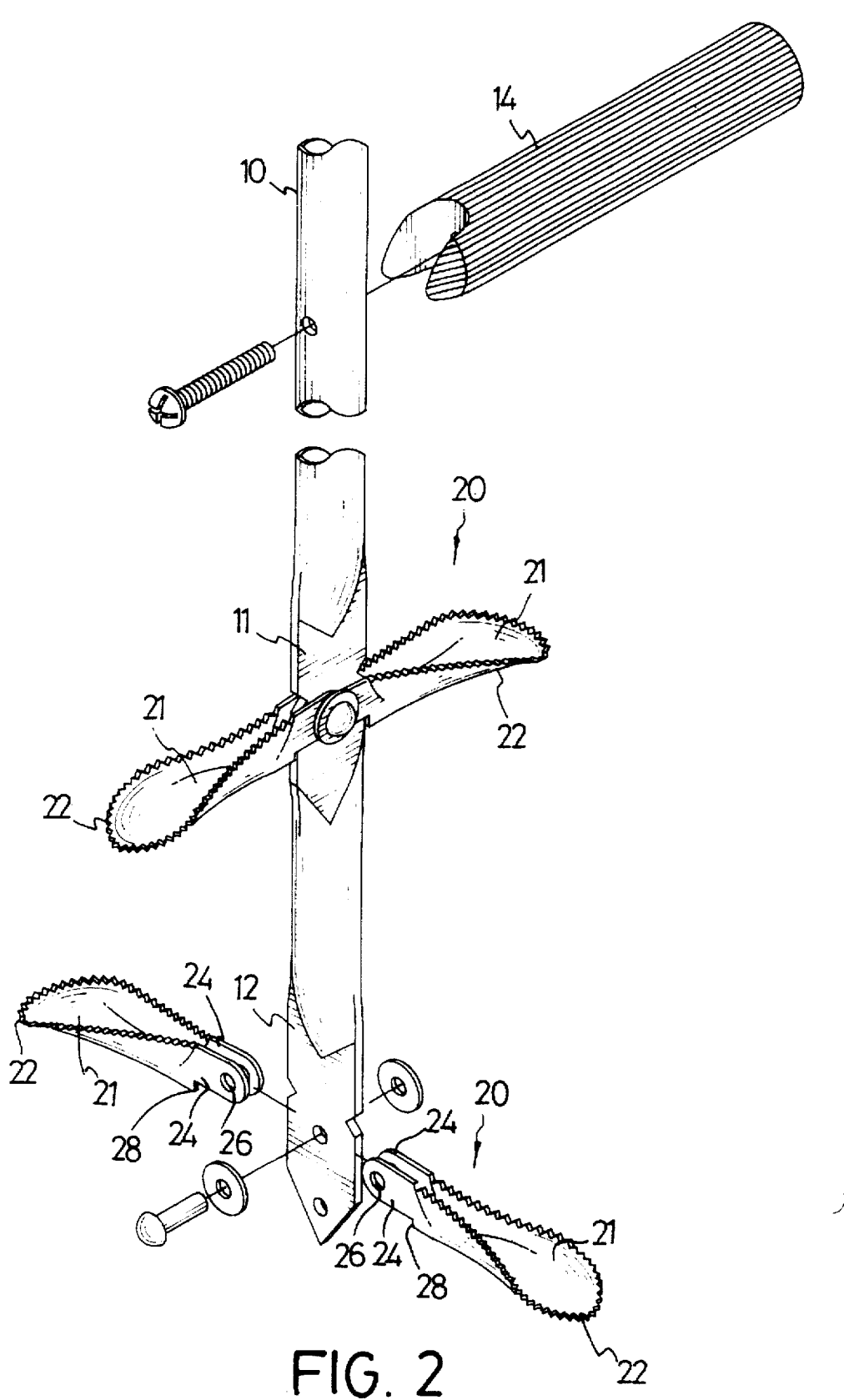
FIG. 2 is a partial perspective view showing the agricultural agitator in accordance with the present invention.
Figure 3:
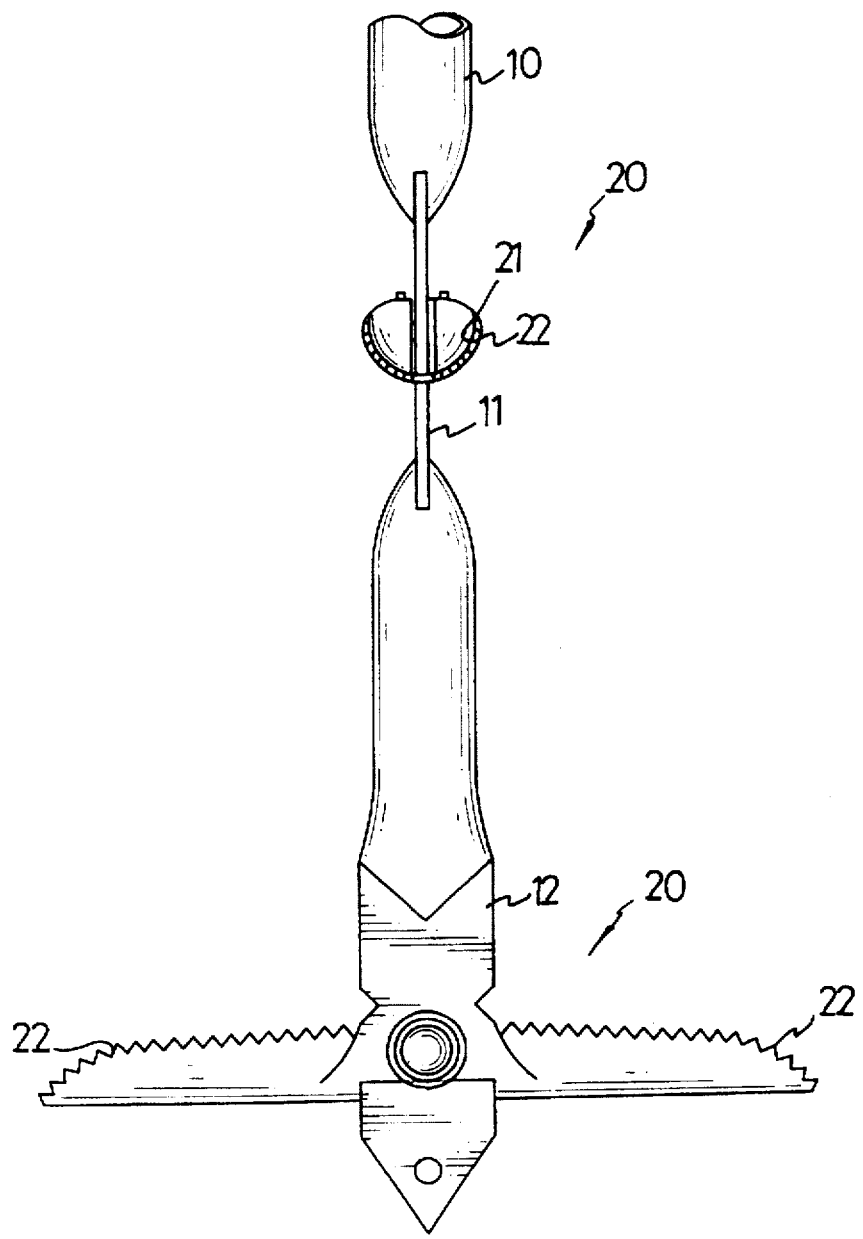
FIG. 3 is a front view showing the agricultural agitator in accordance with the present invention.

Referring to FIG. 2, each blade of the pairs 20 resembles a tongue with a broad substantially flat first end 21 and a second end formed as two upright lugs 24 which are upwardly perpendicular to the respective first end 21. Each lug 24 defines a through hole 26 to align with a respective bore (not numbered) in the first and second flat sections 11, 12. A stop 28 is formed near the second end of each blade of the blade pairs 20, thereby defining a through opening between the lugs 24. The through opening of a first blade of each of the blade pairs 20 is sized to receive one of the first and second flat sections 11, 12 therein. The through opening of the second blade of the blade pairs 20 is sized to receive the lugs 24 of the corresponding first blade such that the respective through holes 26 align with each other and the respective bore of the flat sections 11, 12 after the blade pairs 20 are fitted to the rod 10. A rivet extends through each respective set of aligned through-holes 26 and bores to securely retain the blade pairs 20 to the rod 10. Each blade pair 20 may extend between a first position perpendicular to the rod 10 where the stops of the blade pairs 20 abut the rod 10 and an elevated second position whereby the broad flat first ends 21 are closer to the rod 10. Also, each of the blades 20 has a serrated edge 22 at a periphery thereof so as to hook the stems, leaves, and fibrous roots of plants within the compost during the disturbance process. Additionally, a subsidiary handle 14 is threadedly mounted at an appropriate position on the rod 10 to facilitate pushing and pulling actions of the user. The subsidiary handle 14 has a second advantage that it can be fitted for left-handed and right-handed persons.

Figure 4:
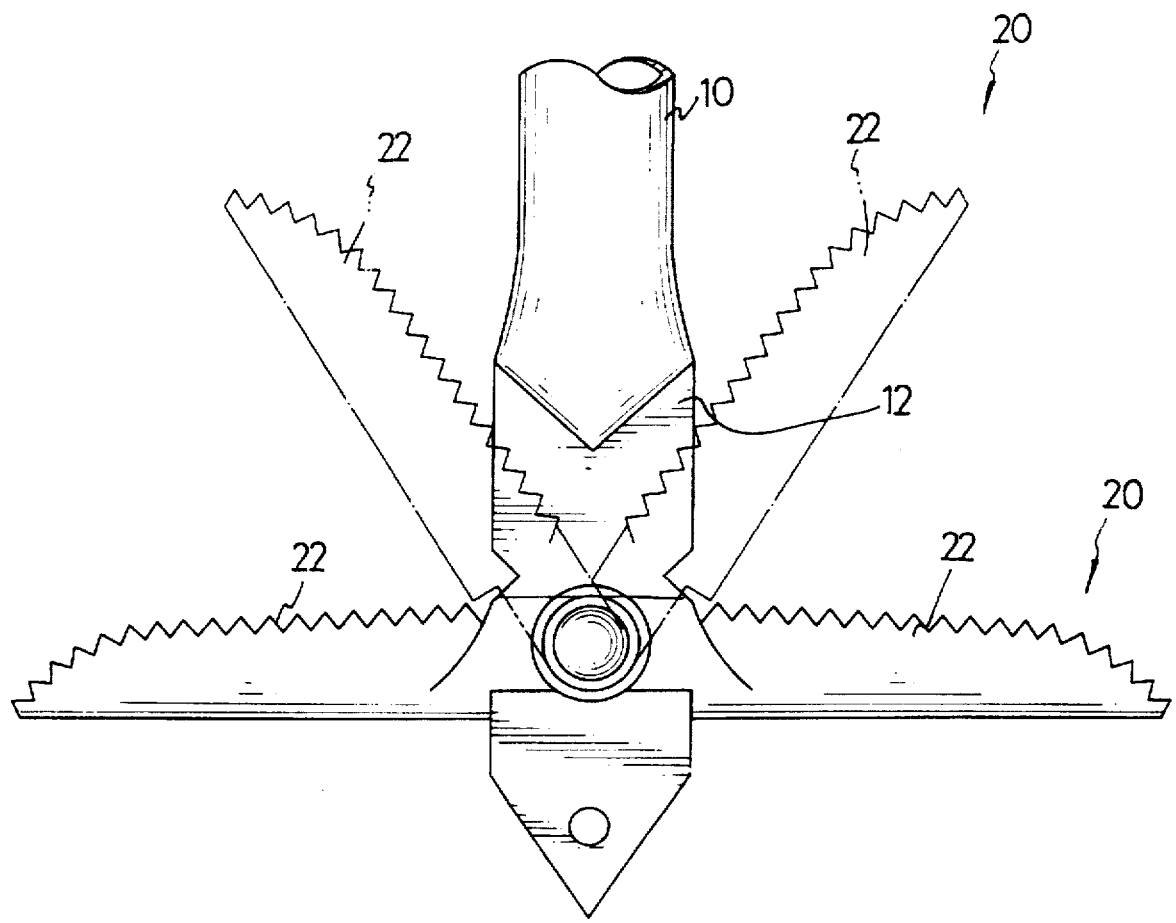
FIG. 4 is an enlarged front view showing the structure and the operation of the blades of the agricultural agitator in accordance with the present invention.

FIG. 4 shows an enlarged front view of the blades 20 of the agricultural agitator in accordance with the present invention. As above mentioned, since each blade 20 is pivotedly and respectively mounted to opposite sides of each of the first and second flat sections 11, 12, when inserting the agricultural agitator into the compost, each pair of blades 20 will pivot on the rivet oppositely and upwardly to form a V-shaped configuration to further facilitate a downward push. When pulling out the agricultural agitator, the weight of the compost will impose a resistance on the blades 20 to cause them to return to their original rod-perpendicular positions. Meanwhile, the blades 20 will help the gas resulted from fermentation to exhaust from loosened clumps of the compost.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An agricultural agitator comprising a rod, a plurality of flat sections formed therealong and at a bottom tip thereof, each said flat section being perpendicular to subsequent flat sections, each of said flat sections having a pair of blades pivotedly mounted on opposite sides thereof, each blade resembling a tongue and defining a bowl therein.

2. The agricultural agitator as claimed in claim 1, wherein said rod further includes a handle mounted at an top position thereon.

3. The agricultural agitator as claimed in claim 1, wherein said flat section formed at the bottom of the rod is shaped as a sharp tip.

4. The agricultural agitator as claimed in claim 1, wherein each of said blades has formed a serrated edge at a periphery thereof.

5. The agricultural agitator as claimed in claim 1, wherein said rod further includes a subsidiary handle mounted thereon.

* * * * *